United States Patent [19]

Jun

[11] Patent Number: 4,847,706

[45] Date of Patent: Jul. 11, 1989

[54] CONTROL CIRCUIT FOR DOUBLE DECK CASSETTE TAPE RECORDER

[75] Inventor: Soo-Sung Jun, Suwon, Rep. of Korea

[73] Assignee: Samsung Electronics Co. Ltd., Rep. of Korea

[21] Appl. No.: 91,276

[22] Filed: Aug. 31, 1987

[30] Foreign Application Priority Data

Aug. 30, 1986 [KR] Rep. of Korea .................. 86-13356

[51] Int. Cl.⁴ ............................................. G11B 15/04
[52] U.S. Cl. ...................................... 360/61; 360/62; 360/63
[58] Field of Search .................. 360/61, 62, 63, 67, 360/68

[56] References Cited

U.S. PATENT DOCUMENTS 4,688,112  8/1987  Shoji et al. ............................ 360/61
4,737,867  4/1988  Ishikawa et al. ...................... 360/61

Primary Examiner—Vincent P. Canney
Assistant Examiner—Kevin J. Fournier
Attorney, Agent, or Firm—Handal & Morofsky

[57] ABSTRACT

The present invention relates to a control circuit for a double deck cassette tape recorder, and comprises switches, resistors, transistors and diodes. A plurality of transistors control the specific circuitry functions of the tape recorder. These transistors are in turn controlled either by switches, directly or indirectly, through other transistors. The present invention offers advantages such as simple structure, low production cost, ease of operation and prevention of confusion or mistakes in operation.

1 Claim, 2 Drawing Sheets

CONTROL CIRCUIT FOR DOUBLE DECK CASSETTE TAPE RECORDER

BACKGROUND OF THE INVENTION

1. Field of the Invention

The present invention relates to a control for a double deck cassette tape recorder and, more particularly, to a control circuit which effectively controls each deck of a double deck cassette tape recorder.

2. Description of the Prior Art

In general, a double deck cassette tape recorder has several functions such as A or B deck playing (let's call one of two decks A and the other B), microphone recording, tuner/phono recording and dubbing between A and B decks. Accordingly, a control circuit is needed to carry out these functions in accordance with signals applied by operated function keys.

In the case of the control circuit for the prior art double deck cassette tape recorder, many mechanical switches were used as said function keys and so, a structure of the control circuit was complicated. Therefore the prior art has disadvantages including elevated production costs and difficulty or user confusion in operation.

SUMMARY OF THE INVENTION

It is an object of the present invention to provide an improved control circuit comprising semi-conductor integrated device for a double deck cassette tape recorder so as to make the structure of the control circiut simpler and thereby, to contribute to a lower production cost, an easy operation by user and a prevention of misoperation by user.

BRIEF DESCRIPTION OF THE DRAWINGS

The above and other objects and features of the present invention will appear more fully hereinafter from a considertion of the following description taken in connection with the accompanying drawings.

DETAILED DESCRIPTION OF THE INVENTION

Figure 1:
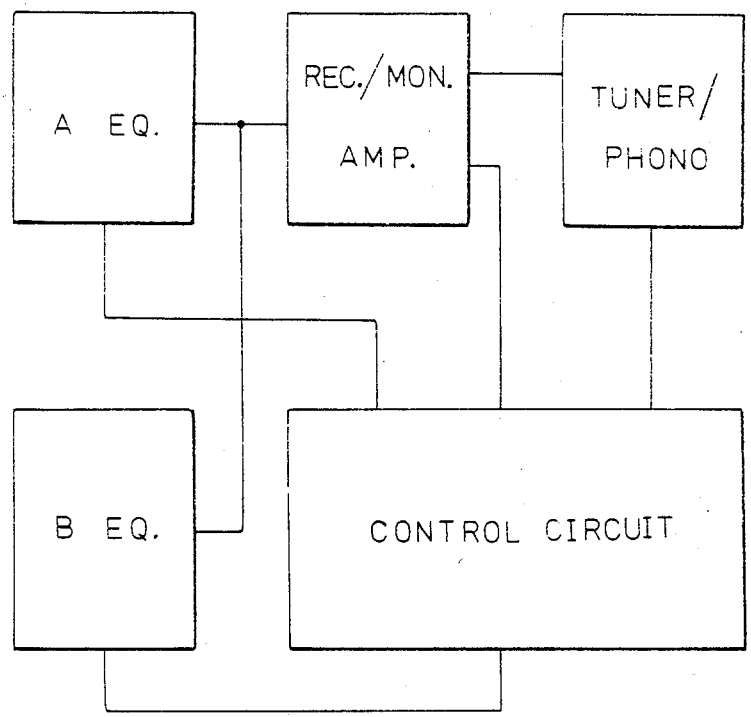
FIG. 1 is a schematic block diagram of a control circuit for a double deck cassette tape recorder according to the present invention.

Referring to FIG. 1, there is shown a schematic block diagram embodying a connection state between the control circuit and each other block according to the present invention. In this figure the control circuit, comprising an integrated circuit device, is connected with an A deck equalizing amplifier, a B deck equalizing amplifier, a recording/monitor amplifier and an input section of tuner/phono respectively, so that an efficient function can be carried out.

Figure 2:
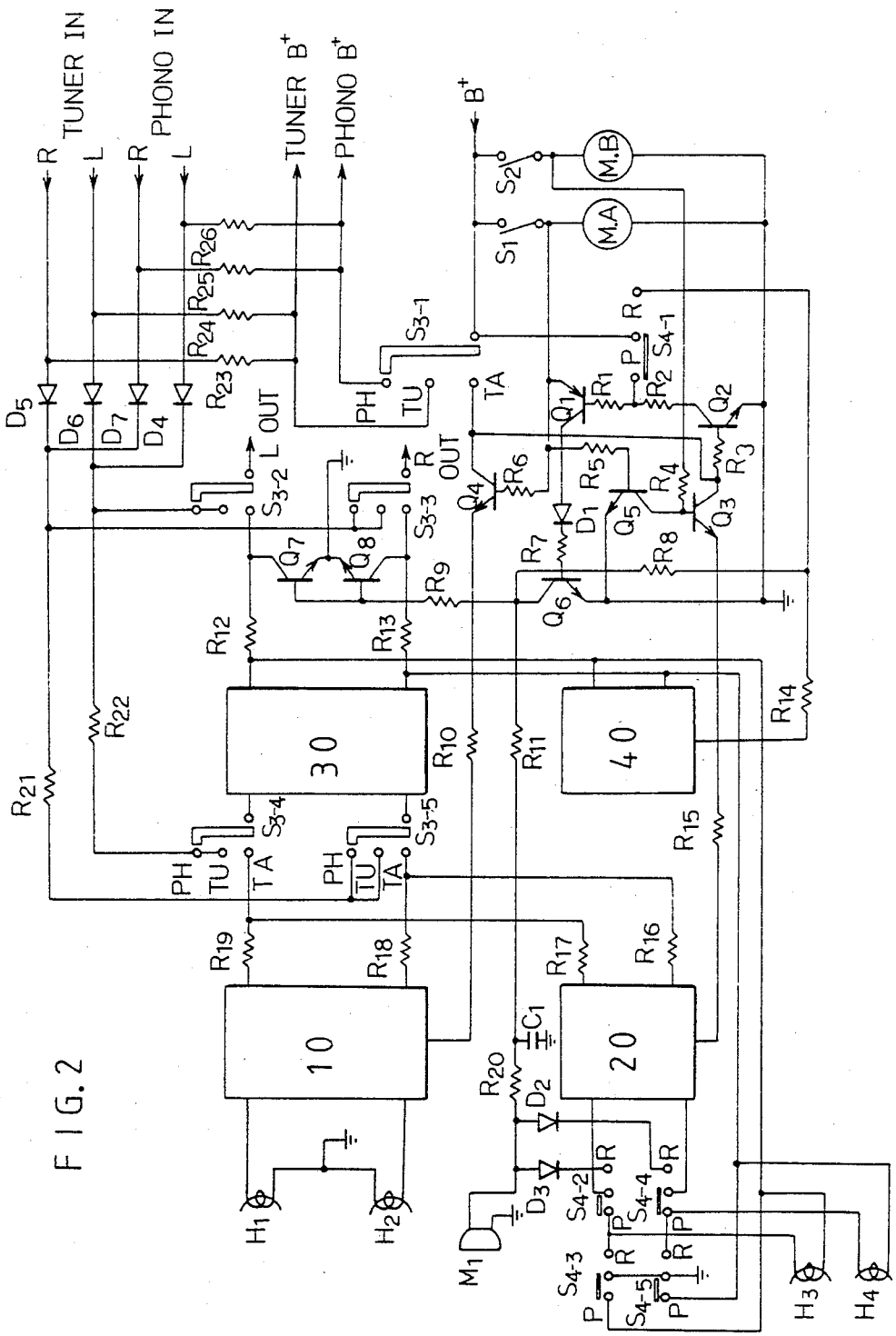
FIG. 2 is a detailed circuit diagram of the embodiment of a control circuit according to the present invention.

In FIG. 2, a structure of the control circuit and its connection with said blocks are illustrated in detail. Referring to FIG. 2, numerals 10 and 20 denote an A deck equalizing amplifier and a B deck equalizing amplifier, respectively, which are connected with heads H1 and H2 of A deck, and H3 and H4 of B deck, respectively. The heads H1 and H3 are for recording/playing and the heads H2 and H4 are for erasing. Numeral 30 denotes a recording/monitor amplifier and Numeral 40 denotes a circuit providing a bias necessary for recording. Also letters M.A. and M.B denote the A deck driving motor and the B deck driving motor, respectively. M1 denotes a microphone for the recording of sounds outside the system.

Additionally, the control circuit of the present invention comprises switches S1 to S4, diodes D1 to D7, transistors Q1 to Q8, resistors R1 to R26 and capacitor C1. The switches S1 and S2 connected with the motors M.A and M.B are A and B deck leaf switches respectively, and the function selection switch S3 represented by S3-1 to S3-5 is a ganged switch which comprises 3 switching selections such as a phono selector PH, a tuner selector TU and a tape selector TA. The recording/playing selection switch S4 comprising S4-1 to S4-5 is another ganged switch which has 2 switching selections such as a playing position P and a recording position R.

Several functions of the double deck cassette tape recorder such as A or B deck playing, microphone recording, dubbing and so on are carried out in compliance with conditions connected with said switches S1 to S4.

According to FIG. 2, each operation of the control circuit of the present invention is explained in the following clauses(1) to (3):

(1) Control of the A and B Deck playing Function

For efficient working of this function, working of any other function shall be eliminated, so that a deterioration of a signal to noise ratio, which may be caused from overlapping and interfering by other functions, can be prevented. Also, in the case of selecting A deck, a selection of B deck shall be eliminated and, in the case of selecting B deck, a selection of A deck shall be eliminated. In a word, mutual selection of decks A and B shall be excluded.

When the functional selection switch S3 is connected with the tape selector TA, an input signal of the tuner/phono section applied to the recording/monitor amplifier 30 is cut off by the functional selection switches S3-2 to S3-5 and a working of tuner/phono not shown in FIG. 2 is excluded by the switch S3-1. At this time, when the A deck leaf switch S1 is ON under the condition that the recording/playing selection switch S4 is connected with the playing selector P, the transistor Q4 is, through the resistor R6, applied by a bias potential and turns on. And the power is, through the resistor R10 applied to the A deck equalizing amplifier 10 and, in the end, a desired playing function for the A deck can be operated.

Though a user moves the B deck leaf switch S2 to the ON position while the A deck leaf switch S1 is ON, the power applied by the A deck leaf switch S1 is, through the resistor R5, applied to the transistor Q5 and the transistor Q5 turns on. So a bias potential of the transistor Q3 applied by the B deck switch S2 and the resistor R3 is excluded and the transistor Q3 turns off. In the end, the power connot be supplied to the B deck equalizing amplifier 20 and playback of the B deck becomes impossible.

When the A deck leaf switch S1 is OFF and the B deck leaf switch S2 is ON, only a B deck playing function can be operated.

(2) Control of the Microphone Recording Function

For efficient working of this function, a working of any other function shall be eliminated. Also even a working of the recording/monitor amplifier 30 shall be eliminated, so that a howling by the interference with speakers not shown in FIG. 2 can be prevented at the time of operating of the microphone.

When the functional selection switch S3 is connected with the tape selector TA, an operating of tuner/phono function is eliminated. At this time, when the recording/playing selection switch S4 is connected with the recording selector R under the condition that the A deck leaf switch S1 is OFF and the B deck leaf switch S2 is ON, the transistor Q6 is maintained to turn off and so, an interference in the power supply line of the resistor R8 supplied by the recording/playing selection switch S4-1 becomes excluded.

When the bias potential is, through the resistor R9, supplied to the transistors Q7 and Q8, the transistor Q7 and Q8 turn on. At this time, the output signals of the recording/monitor amplifier 30 bypass out of the ground through the resistors R12 and R13 respectively, and an operating of the recording/monitor amplifier 30 becomes impossible.

On the other hand, the power supply voltage is, through the resistor R14, applied to the recording bias circuit 40 and simultaneously, is supplied to the microphone M1 through the resistors R8, R11 and R20. Furthermore, the power supply voltage which is divided by the diodes D2 and D3 is supplied to the input of the B deck equalizing amplifier 20. An output of the B deck equalizing amplifier 20 is, through the resistors R16 and R17, applied to the recording/monitor amplifier 30. An output of the recording/monitor amplifier 30 and an output of the recording bias circuit 40 are piled up on one another. So the B deck recording/playing head H3 and the erasing head H4 becomes operated and, accordingly, the microphone function can be operated.

(3) Control of Dubbing Function from A Deck to B Deck

For the efficient working of this function, a working of any other function shall be excluded, and even a working of the microphone M1 shall be excluded, so that an overlapped recording with the microphone M1 can be prevented.

When the functional selection switch S3 is connected with the tape selector TA, a working of the tuner/phone function is excluded.

For dubbing from the A deck to the B deck, the A and B deck leaf switches S1 and S2 shall be maintained to be ON and the recording/playing selection switch S4 is forced to be connected with the recording selector R. Since the A deck leaf switch S1 is ON, the bias potential is, through the resistor R6, supplied to the transistor Q4, the transistor Q4 turns on and so, the power is, through the resistor R10, supplied to the A deck equalizing amplifier 10. In the end, the A deck is on the state of playing.

Also, owing to the A deck leaf switch S1 and the resistor R5, the transistor Q5 turns on and the bias potential of the transistor Q3 becomes excluded. In the end, a working of the B deck equalizing amplifier 20 becomes excluded.

On the other hand, owing to the functional selection switch S3-1 and the resistor RZ, the bias potential is supplied to the transistor Q2, So the transistor Q1 and the diode D1 by means of the resistors R2 and R1 and the transistor Q6 by means of the resistor R7 turn on and so, the power supply line passing by the resistor R8 is excluded, In the end, the recording function by the microphone M1 can be excluded.

As explained in the foregoing, the control circuit for the double deck cassette tape recorder according to the present invention has several advantages in providing simple structure of the circuit by using a semi-conductor integrated device and reducing the number of switches, to reduce the production cost, to prevent misoperating and to assure easy operation.

What is claimed is:

1. In a control circuit for a double deck cassette tape recorder controlling an A and a B deck equalizing amplifier, each of said amplifiers connected with heads, a recording/monitor amplifier, a recording bias circuit, an input signal of a tuner/phono, and A and B deck driving motors, an improvement comprising A and B deck leaf switches for applying a bias potential to the control circuit and for driving A and B deck driving motors; a ganged functional selection switch having three switching selections such as a phono selection, a tuner selection and a tape selection and for controlling the function from these 3 selections; a ganged recording/playing selection switch having two positions including a playing position and a recording position and for converting the playing and recording modes; transistors for cutting off an output signal of a recording/monitor amplifier in compliance with a ganged recording/playing selection switch and a transistor allowing or preventing the operation of a recording/monitor amplifier at the time of operating of a microphone; transistors for controlling a supply of power to A and B deck equalizing amplifiers in compliance with A and B deck leaf switches; and transistors for controlling a supply of power to a microphone and for the prevention of interference from the other modes at the time of a microphone recording mode, wherein said transistors, with the exception of the transistor supplying power to an equalizing amplifier, either control or are controlled by the function of other transistors.

* * * * *